United States Patent [19]
Haardt

[11] Patent Number: 6,078,788
[45] Date of Patent: Jun. 20, 2000

[54] METHOD AND RECEIVER DEVICE FOR RECONSTRUCTING SIGNALS DISTORTED BY MULTI-DIRECTIONAL DIFFUSION

[75] Inventor: Martin Haardt, München, Germany

[73] Assignee: Siemens Aktiengesellschaft, Munich, Germany

[21] Appl. No.: 08/930,237

[22] PCT Filed: Mar. 27, 1996

[86] PCT No.: PCT/DE96/00535

§ 371 Date: Sep. 26, 1997

§ 102(e) Date: Sep. 26, 1997

[87] PCT Pub. No.: WO96/31010

PCT Pub. Date: Oct. 3, 1996

[30] Foreign Application Priority Data

Mar. 30, 1995 [DE] Germany .............. 195 11 751

[51] Int. Cl.$^7$ ...................................... H04B 1/10
[52] U.S. Cl. ................ 455/65; 455/273; 455/276.1; 455/278.1
[58] Field of Search ................... 455/10, 504, 269, 455/272, 276.1, 278.1, 279.1, 295, 296, 307, 277.1, 273, 283, 65; 375/347, 350; 372/195, 378, 408

[56] References Cited

U.S. PATENT DOCUMENTS

| | | |
|---|---|---|
| 4,027,247 | 5/1977 | Aranguren . |
| 4,383,332 | 5/1983 | Glance et al. . |
| 4,736,460 | 4/1988 | Rilling . |

(List continued on next page.)

FOREIGN PATENT DOCUMENTS

| | | |
|---|---|---|
| 30 06 451 | 9/1980 | Germany . |
| WO 89/07864 | 8/1989 | WIPO . |
| WO 93/12590 | 6/1993 | WIPO . |

OTHER PUBLICATIONS

Arthur J. Barabell, "Improving The Resolution Performance of Eigenstructrue–Based Direction–Finding Algorithms", ICASSP (1983), pp. 336–339.

Institute of Network Theory and Circuit Design, Technical University of Munich, Germany, Martin Haardt et al, Unitary ESPRIT: How to Exploit Additional Information Inherent in the Rotational Invariance Structure, 4 pages.

IEEE Transactions on Acoustics, speech and Signal Processing, vol. 37, No. 7, Jul. 1989, Richard Roy et al, ESPRIT—Estimation of Signal Parameters Via Rotational Invariance Techniques, pp. 984–995.

IEEE Transactions on Aerospace and Electronic Systems, vol. 29, No. 1, Jan. 1993, A. Swindlehurst et al, Azimuth/Elevation Direction Finding Using Regular Array Geometries, pp. 145–156.

Proceedings of the IEEE, vol. 81, No. 9, Sep. 1993, Alle–Jan Van Der Veen et al, Subspace–Based Signal Analysis Using Singular Value Decomposition, pp. 1277–1307.

*Primary Examiner*—Nguyen Vo
*Assistant Examiner*—Lester G. Kincaid
*Attorney, Agent, or Firm*—Hill & Simpson

[57] ABSTRACT

Signals distorted by multipath propagation are reconstructed. In a first step, the incidence direction of the wavefronts, that is to say of the respective d dominant signal components, is estimated and the signal components are reconstructed. The wavefronts are separated as a result of the first step. A second step reconstructs the signals distorted by multipath propagation with the aid of the wavefronts, separated by spatial direction, and therefore with the aid of the reconstructed signal components, through combination of the signal components, by assigning the determined d dominant signal components to the l associated signal sources and, expediently, determining delay times and weighting factors with a view to optimal combination of the signal components in order to reconstruct the signals. The method may be applied either to one-dimensional or two-dimensional evaluation of the incidence direction of the wavefronts, and is suitable, in particular, for mobile-radio or wireless communication systems, high-resolution radar image processing systems and sonar systems.

24 Claims, 5 Drawing Sheets

U.S. PATENT DOCUMENTS

| | | | |
|---|---|---|---|
| 4,912,479 | 3/1990 | Nishimura et al. | 342/408 |
| 4,989,262 | 1/1991 | Saito . | |
| 5,359,333 | 10/1994 | Withers, Jr. | 342/378 |
| 5,542,101 | 7/1996 | Pal | 455/278.1 |
| 5,752,173 | 5/1998 | Tsujimoto | 455/273 |

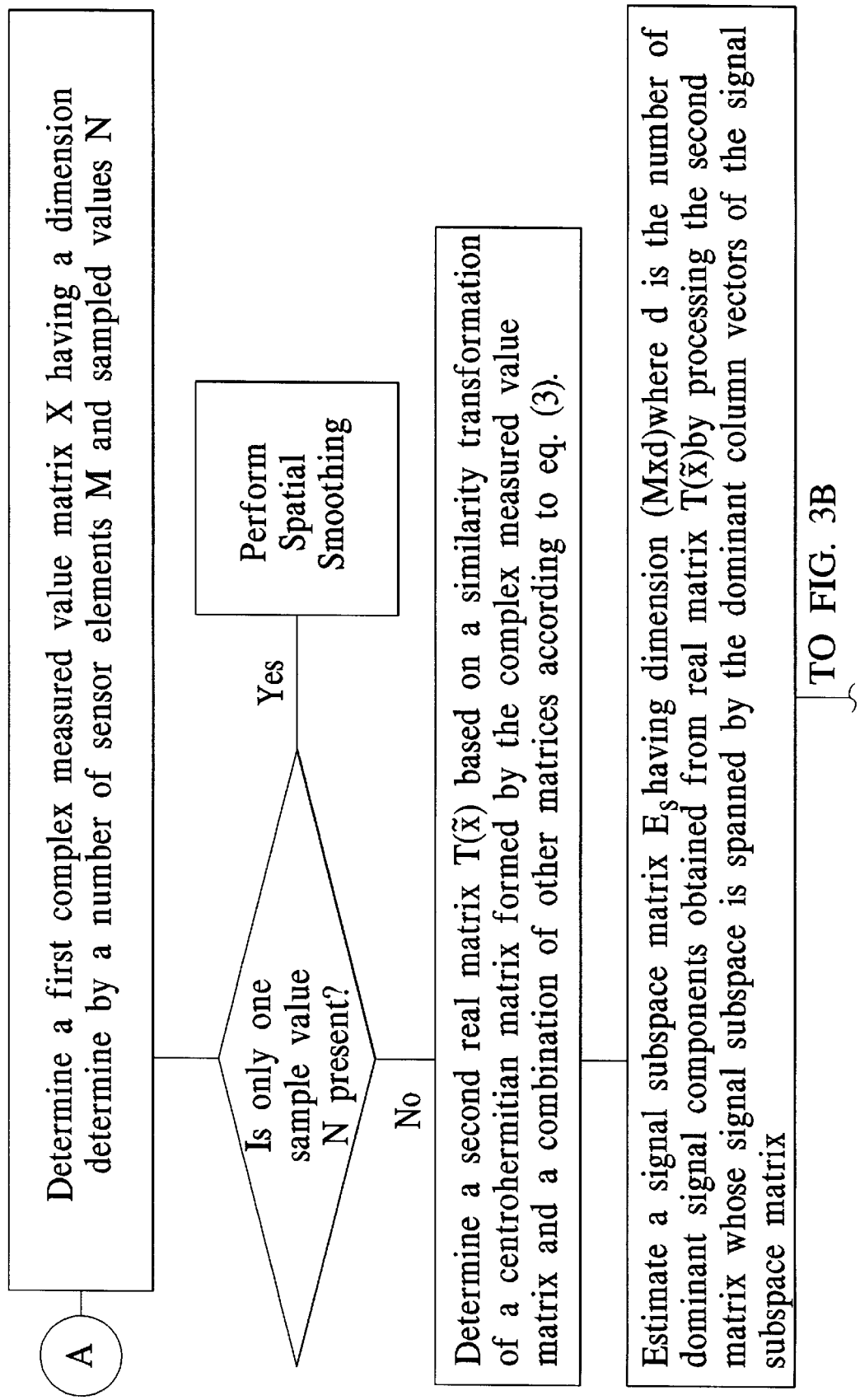

FIG. 3C

↑ FROM FIG. 3B

Determine an eigenvalue matrix from the solution matrix, for example, through eigenvalues decomposition according to eq. (9).

Perform reliability test on the determined eigenvalues. If the test indicates the eigenvalues are unreliable repeat this method from the initial step using additional sensor elements M or sampled values N.

Are the eigenvalues reliable?

No → Increase original number of used sensor elements M or sampled values N. → (A)

Yes ↓

Determine incidence direction $\theta$ of the signals or signal components by applying eq. (10).

Reconstruct signal components by multiplying a pseudo inverse of an estimated system matrix containing phase factors of the determined eigenvalues by the complex measured value matrix.

METHOD AND RECEIVER DEVICE FOR RECONSTRUCTING SIGNALS DISTORTED BY MULTI-DIRECTIONAL DIFFUSION

BACKGROUND OF THE INVENTION

The invention relates to a method and to a receiver device for reconstructing signals distorted by multipath propagation.

In radio systems, in particular mobile radio systems or wireless communication systems, the increasing numbers of subscribers is leading to difficulties when received signals are to be assigned to the signal sources transmitting the signals and the signals are to be reconstructed.

When they propagate through a propagation medium, signals suffer interference from noise. As a result of diffraction and reflection, signal components travel along different propagation paths between the signal source and the signal destination, are superposed at the signal destination and cause cancellation effects there. In addition, when there are a plurality of signal sources, the signals from different signal sources become superposed. Frequency multiplexing, time-division multiplexing or a method known as code division multiplexing use frequency, time-slot or code allocation to each subscriber—that is to say to each signal source while the subscriber is transmitting—and can therefore discriminate between the subscribers in a radio network cell. By these measures, it is also possible to reconstruct signals with multipath propagation. However, difficulties arise in coping with the increasing numbers of subscribers within the constraints of the physical transmission conditions.

A. J. van der Veen, P. B. Ober and E. F. Deprettere, "Azimuth and elevation computation in high resolution DOA estimation", IEEE Trans. Signal Processing, Vol.40, P.1828–1832, July 1992; R. Roy and T. Kailath, "ESPRIT—Estimation of signal parameters via rotational invariance techniques", IEEE Trans. Acoust., Speech, Signal Processing, Vol. ASSP-37, S.984–995, July 1989 and A. L. Swindlehurst and T. Kailath, "Azimuth/elevation direction finding using regular array geometries", IEEE Trans. Aerospace and Electronic Systems, Vol. 29, P. 145–156, January 1993 disclose methods for estimating the incidence directions of different signals at the signal destination. It is possible to determine the incidence direction independently of the chosen modulation methods or the chosen signal waveform, that is to say independently of other subscriber separation methods.

With the "Standard" ESPRIT method disclosed by R. Roy and T. Kailath, "ESPRIT—Estimation of signal parameters via rotational invariance techniques", IEEE Trans. Acoust., Speech, Signal Processing, Vol. ASSP-37, P.984–995, July 1989, the signals can be reconstructed via the determined incidence direction if the signals reach the signal destination by single path propagation. However, in the case of multipath propagation, there is a substantially larger number of incident wavefronts, since a signal breaks down into signal components and these arrive physically as wavefronts at the signal destination via a plurality of propagation paths. The standard ESPRIT method cannot adequately process the wide variety of signal components due, for example, to reflections, and is therefore unsuitable for applications involving multipath propagation of the signals.

Each of German reference DE 30 06 451 A1, U.S. Pat. No. 4,736,460 and U.S. Pat. No. 4,989,262 disclose further circuit arrangements for interference cancellation. WO International reference 93/12590 discloses a method and a device for spatially separating signals which come from a plurality of signal sources and are transmitted simultaneously in the same frequency channel. In this case, the directional properties of the signal sources relative to the receiver (base station) are used for reconstructing the signals from the signal sources. However, only one signal component per signal is evaluated.

SUMMARY OF THE INVENTION

The object of the invention is to provide a method and a receiver device for reconstructing signals distorted by multipath propagation, in which it is possible to recover the signal by assigning to signal sources the wavefronts incident from different directions.

The invention is based on dividing the reconstruction of signals distorted by multipath propagation into two steps, so that in a first step the incidence direction of the wavefronts, of the respective d dominant signal components, is estimated and the signal components are reconstructed. The number p of signal components to be processed is reduced to a number d, it being perfectly possible for d to be larger than the number 1 of signals to be recovered. The p-d lower-power signal components and interference components are then ignored. The wavefronts are separated in the result of the first step, so that the associated signal components are distorted neither by signal components from other signal sources nor by signal components from the same signal source. The lower-power signal components and interference have already been filtered out by the first step. The signal components are in pure form and are distorted by only a small amount of noise.

A second step reconstructs the signals distorted by multipath propagation with the aid of the wavefronts, by separated by spatial direction, and therefore with the aid of the reconstructed signal components, through combination of the signal components, by assigning the determined d dominant signal components to the 1 associated signal sources and, advantageously, determining delay times and weighting factors with a view to optimal combination of the signal components in order to reconstruct the signals—claim 2. The method may be applied either to a one-dimensional or two-dimensional evaluation of the incidence direction of the wavefronts.

Neither exact carrier-frequency evaluation nor time-slot evaluation are needed for the method according to the invention. After the signals or signal components have been transferred to the baseband, they can be processed immediately. Only the nominal carrier frequency needs to be used for transferring the signals or signal components to the baseband. Frequency tracking can be carried out separately for each dominant signal component, and therefore optimally, as a result of the signal-component reconstruction. It is also possible with the aid of a Doppler-frequency measurement to determine the exact respective carrier frequency for each signal component. The different propagation paths of the signals lead to different signal propagation times, which can be compensated for by corresponding delays of the arriving signal components having a shorter propagation time.

It is possible to separate wavefronts that are correlated with one another. This is of particular importance for mobile radio applications. Previous signal reconstruction methods cannot be based on separate wavefronts which may possibly be produced from the source signals by multipath propagation and may be correlated with one another.

The number of separable wavefronts that are strongly correlated with one another can be increased by a spatial smoothing which precedes the determination of the incidence directions of the wavefronts.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

DESCRIPTION OF THE PREFERRED EMBODIMENTS

One mobile signal sources $SQ_1, SQ_2$, in the illustrative embodiment l=2, are connected to a base station BS via radio links. The signals $s_1, s_2$ transmitted by the two signal sources $SQ_1, SQ_2$ are subject to interference and arrive via multipath propagation as signal components $x_k$ at an antenna group AG assigned to the base station BS. Thus, the dominant signal components $x_1, x_2$ of the first signal $s_1$ and the dominant signal components $x_3, x_4$ of the second signal $s_2$ reach the base station BS antenna group AG assigned to one receiver device. In addition to this, the lower-power signal components $x_5, x_6$, and the interference components $x_7, x_8, x_9$ reach the antenna group AG.

In addition to an RF element, each antenna element of the antenna group AG contains a device for converting the radiofrequency signal received using the antenna elements, or the signal components, into a complex baseband signal which is then sampled N times during a window length.

Figure 1:
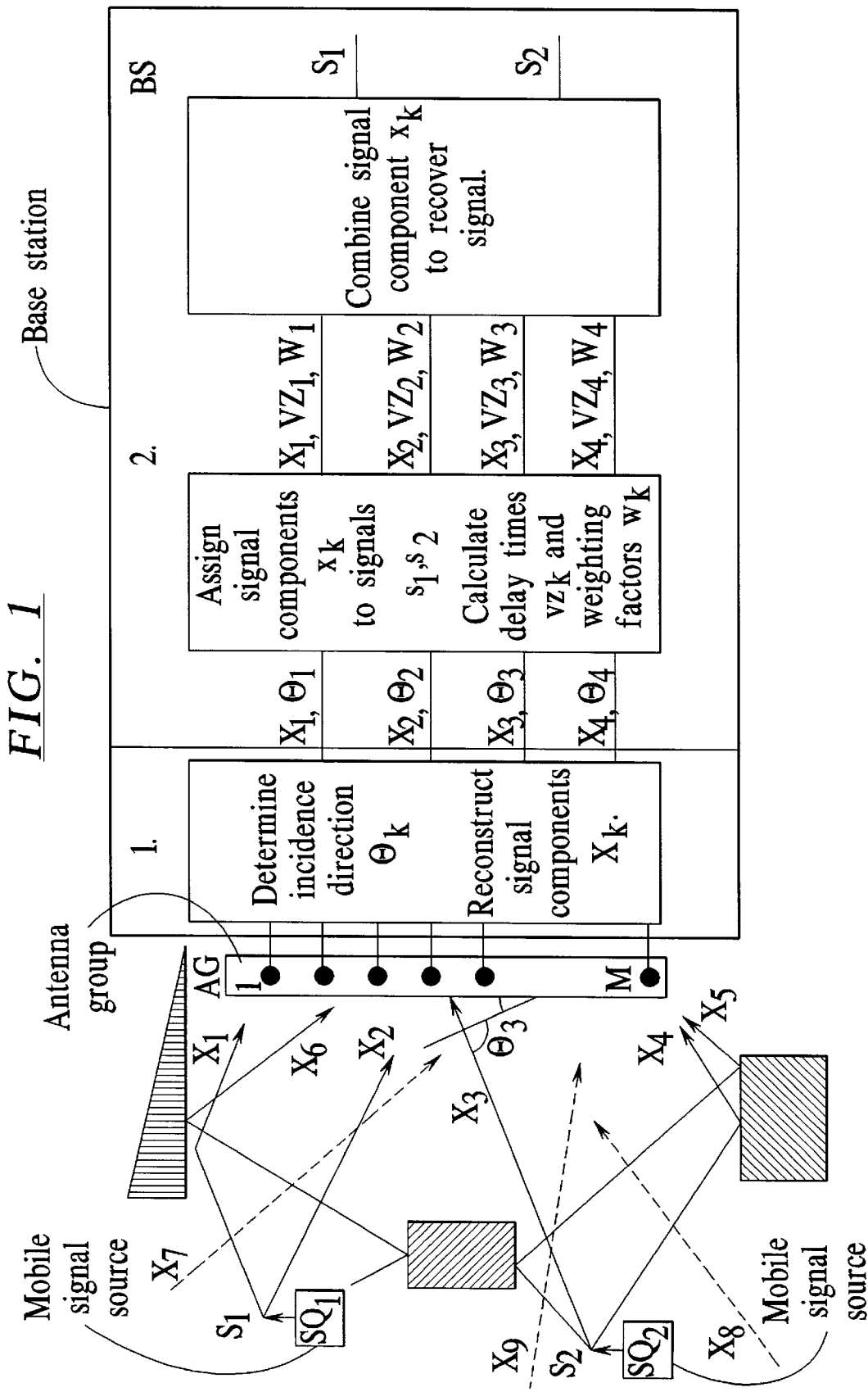
FIG. 1 depicts a mobile radio with only a one-dimensional incidence-direction evaluation according to $\theta_k$.
Figure 2:
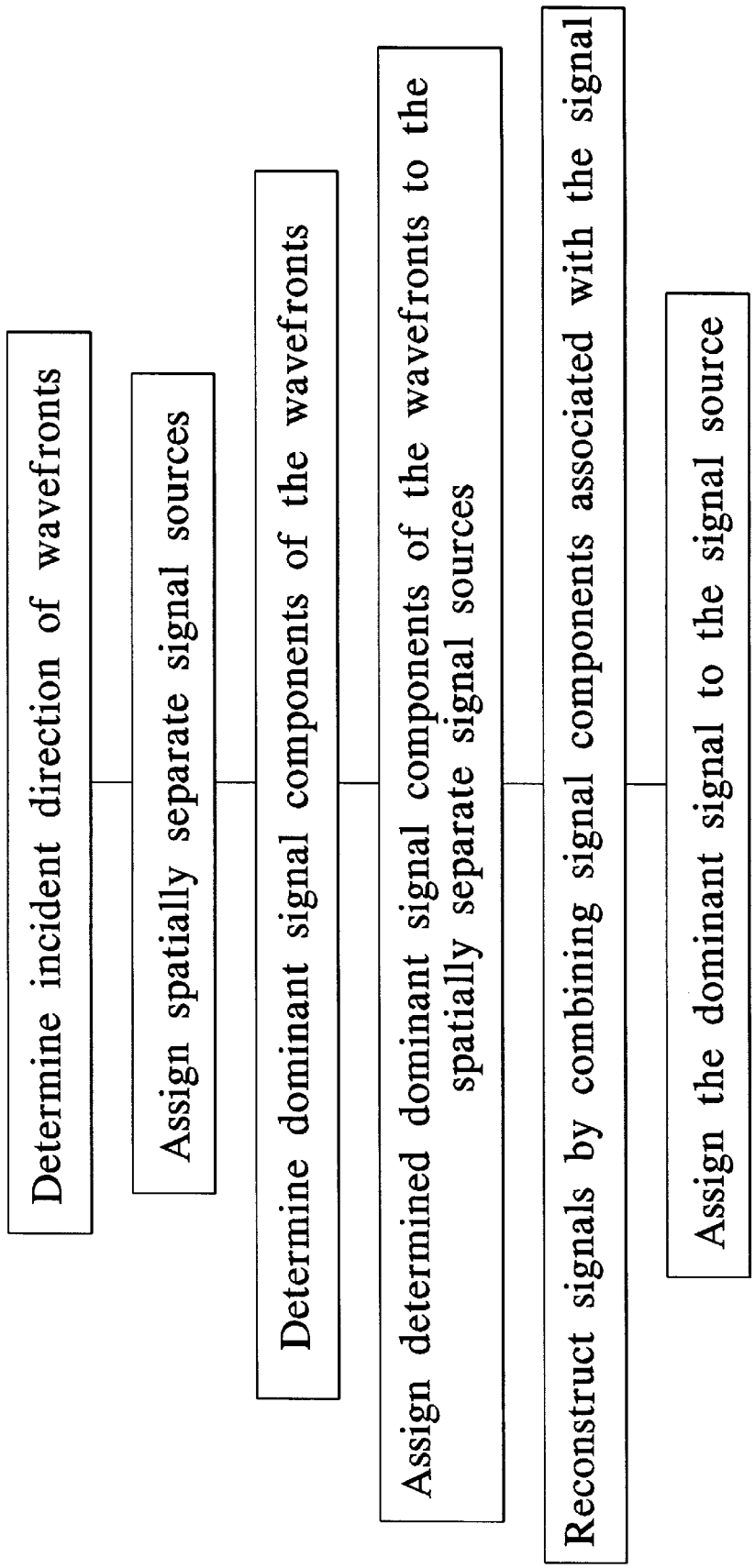
FIG. 2 depicts a flowchart of the method of the present invention.
Figure 3B:
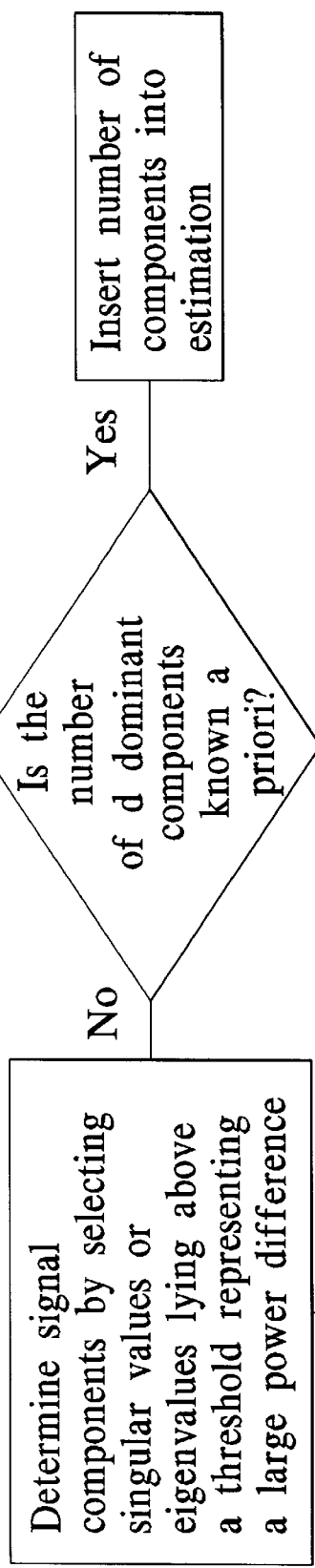
FIG. 3 depicts a more detailed flowchart of the method of the present invention.

In order to determine the incidence direction $\theta_k$ of the wavefronts associated with the respective four dominant signal components $x_k$ (k=1 ... d=4) while ignoring the five lower-power signal components or interference components $x_k$ (k=d+1=5 ... p=9) and to reconstruct the dominant signal components $x_k$, the method presented below (see FIGS. 2 and 3) is, for example, resorted to.

The antenna group AG consists of M elements. In the illustrated embodiment, it is a uniform linear antenna group AG having an element spacing $\Delta$ of less than or equal to half of the wavelength $\lambda$. The wavefronts of the signal components $x_k$ respectively arrive at an angle $\theta_{1,2\ldots 9}$ on the one-dimensional antenna group AG. The window length N is in this case chosen in such a way that the incidence angles $\theta_{1,2\ldots 9}$ can be regarded as constant during the sampling over a window length N. The directional evaluation is based on the fact that a signal component $x_k$ arrives with a time delay at the different antenna elements. There is therefore a phase shift between the sampled values of a signal component $x_k$ at the different antenna elements, this shift being a function of the incidence direction $\theta_k$. Determining the phase shift makes it possible to determine the incidence direction $\theta_k$ of the signal component $x_k$. The directional determination presupposes that all the signal components $x_k$ have the same carrier frequency.

The configuration of the antenna group AG is, however, subject to a condition in the context of the method according to the invention. The antenna group 18 must be centrosymmetric, that is to say the geometrical arrangement of the elements must be pairwise symmetric relative to a center, and the complex properties of symmetrical antenna elements must be identical. In addition, a one-dimensional antenna group AG must exhibit invariance in the direction of a position coordinate. The following notation is used below: column vectors or matrices are marked by bold lower case or upper case letters; transposed, complex-conjugate or adjoint matrices and vectors are suffixed T, * or H.

The system matrix A of the antenna group AG is centrosymmetric and therefore fulfils specific conditions which can be described by equation (1)

$$\Pi_M A^* = A\Lambda \quad A \in C^{M \times d}, \tag{1}$$

the complex matrix $\Lambda$ being a unitary diagonal matrix of dimension d×d and d specifying independently of time over a window length N the number of dominant incident signal components $x_k$. $\Pi_M$ is an antidiagonal permutation matrix of dimension M. It is also to be noted in advance that the system of matrices of the two subgroups to be formed from the antenna group AG must likewise fulfil the condition according to equation (1).

As regards the bandwidth of the signals received by the centrosymmetric antenna group AG, it should be noted that, during the propagation along the antenna aperture of the wavefronts associated with the signal components $x_k$, no significant change in the complex envelope of the signal components $x_k$ is allowed to occur.

The number of sampled values N is freely selectable, the estimation accuracy improving as the number N of sampled values increases, but so does the dimension of a measured-value matrix $\tilde{X}$, determined by the number of elements M and the number of sampled values N, in which case $\tilde{x}_i(k)$ with (i=1,2,... M) and (k=1,2,... N) gives the kth sampled value of the ith sensor, and the measured-value matrix $\tilde{X}$ has the form:

$$\tilde{X} \in C^{M \times N} = \begin{bmatrix} \tilde{x}_1(1) & \tilde{x}_1(2) & \ldots & \tilde{x}_1(N) \\ \tilde{x}_2(1) & \tilde{x}_2(2) & \ldots & \tilde{x}_2(N) \\ \ldots & \ldots & \ldots & \ldots \\ \tilde{x}_M(1) & \tilde{x}_M(2) & \ldots & \tilde{x}_M(N) \end{bmatrix}. \tag{2}$$

It is more difficult to process high-dimension matrices than matrices of smaller dimensions. The same is true for complex matrices, determined by real and imaginary parts, in comparison with real matrices. More straightforward processing in the signal evaluation methods is a prerequisite for the use of these methods in real-time systems.

The method is based on available measured values $\tilde{X}_1(k)$ received by the antenna group AG and subsequently conditioned, and is implemented in a signal-processing means, for example a digital signalling processor, of the receiver device.

As a first step in the method, the sampled values for each antenna element are entered in the same sequence in the measured-value matrix $\tilde{X}$. If only one sampled value is available, spatial smoothing of the measured values should follow. B. Widrow et al., "Signal Cancellation Phenomena in Adaptive Antennas: Causes and Cures", in IEEE Trans. on Antennas and Propagation, Vol. AP-30, S. 469–478, May 1982 discloses spatial smoothing methods. When spatial smoothing is employed in the direction determination method of the illustrative embodiment, the antenna group AG is subdivided into a plurality of subgroups and the sampled measured values $\tilde{x}_i(k)$ are pre-averaged, so that even a number of coherent signal components $x_k$, corresponding to double the number of subgroups formed, can be detected simultaneously if they arrive from different directions.

After initialization, the complex measured-value matrix $\tilde{X}$ is transformed into a second, purely real matrix $T(\tilde{X})$ in accordance with equation (3).

$$T(\tilde{X}) = Q_M^H [\tilde{X} \Pi_M \tilde{X}^* \Pi_N] Q_{2N}. \quad (3)$$

The matrices $Q^H_M$ and $Q_{2N}$ are unitary, left matrices which should be selected, for example according to (4) and (5):

$$Q_{2n} = \frac{1}{\sqrt{2}} \begin{bmatrix} I_n & jI_n \\ \Pi_n & -j\Pi_n \end{bmatrix} \text{ for matrices of even order} \quad (4)$$

$$Q_{2n+1} = \frac{1}{\sqrt{2}} \begin{bmatrix} I_n & 0 & jI_n \\ 0^T & \sqrt{2} & 0^T \\ \Pi_n & 0 & -j\Pi_n \end{bmatrix} \text{ for odd matrices} \quad (5)$$

is an n-dimensional unit matrix).

A left Π-real matrix generally satisfies the condition $\Pi_P Q^* = Q$ with $Q \in C^{xxx}$. $\Pi_M$ and $\Pi_M$ are antidiagonal permutation matrices whose dimension corresponds to the number of sensor-group elements group M or the number of sampled values N. $\Pi_n$ is an n-dimensional antidiagonal permutation matrix.

The second, purely real matrix $T(\tilde{X})$ has dimension (M×2N), and thus doubles the number of matrix elements available simply by relatively uncomplicated computing operations. Doubling the dimension in comparison with the measured-value matrix $\tilde{x}$ affords a forward/backward averaging which is inherent in the method.

A signal subspace estimate is made as the next step in the method. Methods which can be used for this purpose are explained in further detail in A. J. van der Veen, E. F. Deprettere and A. L. Swindlehurst, "Subspace-based signal analysis using singular value decomposition", Proc. IEEE, Vol. 81, P. 1277–1308, September 1993. A signal-subspace matrix E. having dimension (M×d) whose d columns span the d-dimensional signal-subspace, is obtained from the second, purely real matrix $T(\tilde{X})$. If the number of sampled value N does not correspond to the number d of dominant components $x_k$, then the rank is therefore reduced. The number d of dominant signal components $x_k$ may be known a priori and thus be available for the method, or it is determined in this step of the method. The d dominant singular values or eigenvalues representing the signal components $x_k$ can be determined by selecting the singular values or eigenvalues lying above a threshold value representing a large power difference. Many methods for signal subspace estimation also implicitly contain this determination. A method known to the person skilled in the art as singular value decomposition of the second, purely real matrix $T(\tilde{X})$ is chosen for determining the signal subspace matrix $E_s$ produced from the second, purely real matrix $T(\tilde{X})$. The eigenvalue decomposition of the estimated covariance matrix $T(\tilde{X})T^M(\tilde{X})$ or a Schur-like signal subspace estimation method can likewise be chosen.

The uniform linear antenna group AG is divided below in the illustrative embodiment of the one-dimensional method into two identical subgroups which are, however, shifted by an element spacing Δ. It is to be noted in this case that the subgroups are symmetrical with one another relative to the center of the antenna group center—this can be the case only with antenna groups which are already symmetrical. As a rule, as large as possible an overlap of the subgroups is desired, since in this way each subgroup can have a maximum number m of antenna elements and as high as possible a resolution can be achieved.

In the case of maximum overlap, and given a constant element spacing, the spacing Δ of the two subgroups is equal to this element spacing Δ. If individual antenna elements fail, uniform antenna groups can more easily be matched while retaining the symmetry.

Selection matrices $K_1$, $K_2$ must be set up in order to set up a possibly overdefined system of equations for the signal subspace matrix. $E_s$. These selection matrices $K_1, K_2$ are obtained from a similarity transformation in accordance with equation (6) from centrohermitian matrices.

$$K_1 = Q_m^H (J_1 + J_2) Q_M$$
$$K_2 = Q_m^H j (J_1 - J_2) Q_M \quad (6)$$

For the selected antenna group AG (number of elements M, number of subgroup elements m), auxiliary matrices $J_1$, $J_2$ $\in R^{m \times M}$ are for example yielded:

$$J_1 = \begin{bmatrix} 1 & 0 & \ldots & 0 & 0 & 0 \\ 0 & 1 & \ldots & 0 & 0 & 0 \\ \ldots & \ldots & \ldots & \ldots & \ldots & \ldots \\ 0 & 0 & \ldots & 1 & 0 & 0 \\ 0 & 0 & \ldots & 0 & 1 & 0 \end{bmatrix} \text{ and} \quad (7)$$

$$J_2 = \begin{bmatrix} 0 & 1 & 0 & \ldots & 0 & 0 \\ 0 & 0 & 1 & \ldots & 0 & 0 \\ \ldots & \ldots & \ldots & \ldots & \ldots & \ldots \\ 0 & 0 & 0 & \ldots & 1 & 0 \\ 0 & 0 & 0 & \ldots & 0 & 1 \end{bmatrix}.$$

The auxiliary matrix $J_1$ selects the elements of the first subgroup, the auxiliary matrix $J_2$ selects the elements of the second subgroup. This results in the selection matrices $K_1$, $K_2$ when choosing the left Π-real matrices $Q^{Hm}$, $Q_m$ for M=6 and m=5 in accordance with equations (4) and (5).

It is then possible to set up a system of equations in accordance with equation (8):

$$K_1 E_S Y \approx K_2 E_S \quad (8)$$

The again purely real solution matrix Y, $Y \in R^{d \times d}$ can be found approximately with the aid of known solution methods for systems of equations, for example the least-squares method.

The eigenvalue matrix $\Omega \in R^{d \times d}$ is determined from the solution matrix Y through an eigenvalue decomposition according to equation (9)

$$Y = T \Omega T^{-1} \in R^{d \times d}. \quad (9)$$

On its diagonal, the eigenvalue matrix $\Omega$ contains the eigenvalues $\omega_k$ ($\Omega$=diag ($\omega_k$)). The matrices T and $T^{-1}$ represent a column matrix of the eigenvectors, or the same in an inverted form. The eigenvalues $\omega_k$ can, however, also be determined by a Schur decomposition.

With a reliability test which particularly distinguishes the one-dimensional method according to the invention, all the values $\omega_k$ determined are tested for their properties. If only real eigenvalues $\omega_k$ are established, then the determined eigenvalues $\omega_k$ can be regarded as reliable. When complex-conjugate solutions occur, this reliability is not obtained, and it is necessary to repeat the method with a larger number of sensor elements M or a larger number of sampled values N.

The incidence directions θ of the signals or signal components for the directional estimation of the incident wavefronts are determined through equation (10)

$$\mu_k = 2 \arctan \omega_k = 2\pi/\gamma \cdot \Delta \sin \theta_k$$

The wavelength λ is equal for the signals $S_1, S_2$.

The signal components $x_k$ (k=1 ... d=4) are recovered by multiplying a pseudo-inverse of the estimated system matrix $\hat{A}$, $\hat{A} \in R^{M \times d}$, which contains the phase factors $e^{j\mu k}$ of the determined eigenvalues $\omega_k$ by the measured-value matrix $\tilde{X}$, in accordance with general equation (11).

$$\hat{x} = \hat{A}^+ \tilde{X}, \qquad (11)$$

A suitable pseudo-inverse $\hat{A}^+$ of the system matrix $\hat{A}$ specified in equation (12) for the illustrative embodiment (d=4) being formed, for example, through equation (13).

The estimated system matrix $\hat{A}$ of the illustrative embodiment has the form:

$$\hat{A} = \begin{bmatrix} 1 & 1 & 1 & 1 \\ e^{j\mu_1} & e^{j\mu_2} & e^{j\mu_3} & e^{j\mu_4} \\ e^{j2\mu_1} & e^{j2\mu_2} & e^{j2\mu_3} & e^{j2\mu_4} \\ \cdots & \cdots & \cdots & \cdots \\ e^{j(M-1)\mu_1} & e^{j(M-1)\mu_2} & e^{j(M-1)\mu_3} & e^{j(M-1)\mu_4} \end{bmatrix}. \qquad (12)$$

The equation for forming the pseudoinverse $\hat{A}^+$ of the estimated system matrix $\hat{A}$ can be written as follows:

$$\hat{A}^+ = (A^H A)^{-1} A^H. \qquad (13)$$

As a result of this step of the method, the incidence directions $\theta_k$ of the d dominant wavefronts, i.e. signal components $x_k$, are determined in spite of possibly strong correlation and the wavefronts are reconstructed. It is even possible for two coherent wavefronts to be resolved. If it is necessary to discriminate between a relatively large number of coherent wavefronts, then it is expedient for a method known as "spatial smoothing" to precede the determination of the incidence direction.

The determined d dominant signal components $x_k$ (k=1 ... d=4) are assigned to the associated signal sources $SQ_1, SQ_2$, for example by a method disclosed by J. G. Proakis, "Digital Communications", McGraw Hill, N.Y., 1989, 2nd edition, in which each subscriber is allocated a code which is contained in the transmitted signals and therefore also in all relevant signal components.

According, for example to the maximum ratio method disclosed by J. G. Proakis, "Digital Communications", McGraw Hill, N.Y., 1989, 2nd edition, with the aid of the d reconstructed wavefronts, a delay time $vz_k$ and a weighting factor $W_k$ are then calculated for each signal component $x_k$ in the context of assigning a group of signal components $x_{1,2}, x_{3,4}$ to the respective source signal $s_1, s_2$.

Knowledge of the reconstructed wavefronts allows for the first time optimum calculation criteria to be used for this calculation.

The signals, $s_1, s_2$ are lastly recovered by combining the signal components $x_k$ associated with the respective signal source $SQ_1, SQ_2$.

Methods for directionally dependent evaluation of received signals, i.e. spatial filtering, can be applied to the reception of electromagnetic, acoustic and other waveforms.

For two-dimensional evaluation, the incidence direction $\theta_k, \phi_k$ of the wavefronts is resolved in two space coordinates.

The estimated system matrix $\hat{A}$ obtained from the receiver by the evaluation device can also be used for transmissions.

If the uniform linear antenna group AG and the antennas of the signal sources $SQ_1, SQ_2$ are respectively transmission and reception antennas, then the signal paths for the cases of transmission and reception are identical. The signals to be transmitted by the antenna group AG can then be decomposed into signal components and broadcast in different directions, determined by the reception, in such a way that they constructively interfere at the receiver.

What is claimed is:

1. A method for reconstructing signals distorted by multipath propagation, wavefronts assignable to signal components being received by a centrosymmetric sensor group having sensor elements, having two measures to be carried out separately, comprising the steps of:

in a first measure, determining incidence direction of wavefronts associated with respective dominant signal components ignoring lower-power signal components and interference components by utilizing phase differences occurring between the sensor elements with respect to a wavefront, and reconstructing the dominant signal components; and in a second measure that is carried out separately from the first measure and utilizing the dominant signal components reconstructed according to the first measure, assigning the determined dominant signal components to associated spatially separate signal sources and reconstructing the signals by combination of signal components associated with a signal source.

2. The method as claimed in claim 1, wherein based on the assignment of the dominant signal components to the signal sources the method further comprises assigning, an assignment of delay times and weighting factors, which permits correctly phased superposition, for the signal components respectively associated with a signal source.

3. The method as claimed in claim 1, wherein, as the first measure, the method further comprises:

initializing a complex measured-value matrix $(\tilde{x})$ having a dimension (M×N) determined by a number of sensor elements and a number of sampled values by storing the sampled values, determining a second, purely real matrix $(T(\tilde{x}))$ which exclusively contains real values, which can be assigned to the measured values and which has double the number of elements, by a similarity transformation of a centrohermitian matrix, formed by the complex measured-value matrix $(\tilde{x})$ and a combination of an M-dimensional antidiagonal permutation matrix $(\Pi_M)$, a complex conjugate $(\tilde{x}^*)$ of the measured-value matrix and an N-dimensional antidiagonal permutation matrix $(\Pi_N)$, via an M-dimensional left Π-real adjoint matrix $(Q_M^H)$ and an 2N-dimensional left Π-real matrix $(Q_{2N})$ according to the relationship $T(\tilde{x}) = Q_M^H Q_{2N}$, performing a signal subspace estimation for determining the real signal subspace matrix $(E_s)$ by processing the second, purely real matrix $(T(\tilde{x}))$ whose signal subspace is spanned by the dominant column vectors of the signal subspace matrix $(E_s)$, performing a subgroup formation, carried out separately for each evaluation dimension of the method, of the centrosymmetric sensor group into two subgroups, shifted relative to one another, is carried out and two selection matrices $(K_1, K_2)$ are established for each evaluation dimension in accordance with configuration of the subgroups, determining a solution, carried out separately for each evaluation dimension of the method, determined by the signal subspace matrix ($E_s$), resulting from the signal subgroup formation and containing the dominant column vectors, and the selection matrices ($K_1$, $K_2$) so that in each case a solution matrix (Y) according to $K_1 E_s Y \approx K_2 E_s$ is available, determining an eigenvalue matrix, which is real or complex depending on a dimension of the evaluation method, from the solution matrix (Y); and reconstructing the signal components by multiplying a pseudo inverse of an estimated system matrix, containing the phase factors of the determined eigenvalues, by the complex measured-value matrix ($\tilde{x}$).

4. The method as claimed in claim 3, wherein the method further comprises a reliability estimate of the method is provided by a test of the determined eigenvalues.

5. The method as claimed in claim 1, wherein the sensor group is two dimensional and consists of M elements, and wherein the method only has two direction-evaluation dimensions.

6. The method as claimed in claim 6, wherein the sensor group, which is two-dimensional, extensive, centrosymmetric and invariant in two directions, consists of M elements and the method has evaluation dimensions x and y, wherein the method further comprises:

determining the selection matrices ($K_{\mu 1}$, $K_{\mu 2}$, $K_{\nu 1}$, $K_{\nu 2}$) in accordance with the two dimensions of the sensor group, producing a system of equations, determined by the signal subspace matrix ($E_s$), from a signal subgroup formation, containing the dominant signal vectors, and solving the selection matrices ($K_1$, $K_2$) for the dimensions x and y according to the relationships $K_{\mu,\nu 1} E_s Y_{\mu,\nu} \approx K_{\mu,\nu 2} E_s$, so that in each case a solution matrix (Y) according to $K_1 E_2 Y \approx K_2 E_s$ is implemented and the solution matrices ($Y_\mu$, $Y_\nu$) are available, pairing eigenvalues of the solution matrices ($Y_\mu$, $Y_\nu$) via complex determination of the complex eigenvalue matrix according to the relationship $Y_\mu + jY_\nu = T\Omega T^{-1}$, and determining the incidence directions, represented by the azimuth and elevation angle by the relationships $\omega_{\mu k}=\tan(\mu_k/2)$, $=\tan(\nu_k/2)$; $\mu_k=\cos\phi_k \sin\theta_k$, $\nu_k=\sin\phi_k \sin\theta_k$, and $\mu_k=2\Pi/\lambda \cdot \Delta_x u_k$, $\nu_k=2\Pi/\lambda \cdot \Delta_y v_k$.

7. The method as claimed in claim 6, wherein the method further comprises spatially smoothing the measured values before the incidence directions are determined.

8. The method as claimed in claim 1, wherein the sensors are antennas for transmitting and receiving radio-frequency electromagnetic signals.

9. The method as claimed in claim 8, wherein the method is utilized in mobile radio systems.

10. The method as claimed in claim 8, wherein the method is utilized in wired communication systems.

11. The method as claimed in claim 8, wherein the method is utilized in high-resolution radar image processing systems.

12. The method as claimed in claim 1, wherein the sensor group is one-dimensional and consists of M elements, and wherein the method only has one direction-evaluation dimension.

13. The method as claimed in claim 1, wherein the sensors are sound receivers for transmitting and receiving acoustic signals.

14. The method as claimed in claim 13, wherein the method is utilized in sonar systems.

15. The method as claimed in claim 13, wherein the method is utilized in medical technology systems.

16. A receiver device, comprising:

an allocated centrosymmetric sensor group, having sensor elements, which receives wavefronts assignable to signal components; and signal-processing means for reconstructing signals distorted by multipath propagation, wherein the receiver device effects 1) determination of the incidence direction of wavefronts associated with respective dominant signal components while ignoring lower-power signal components and interference components by utilizing phase differences occurring between the sensor elements with respect to a wavefront, and reconstruction of the dominant signal components, and 2) using the dominant signal components reconstructed according to measure 1), assignment of the determined dominant signal components to the associated spatially separated signal sources, and reconstruction of the signals by combination of signal components associated with a signal source.

17. The receiver device as claimed in claim 16, wherein, using the signal-processing means, based on assignment of the dominant signal components to the signal sources an assignment of delay times and weighting factors which permits correctly phased superposition is carried out for the signal components respectively associated with a signal source.

18. The receiver device as claimed in claim 16, wherein, as the first measure, using the signal-processing means, a complex measured-value matrix ($\tilde{x}$) having a dimension (M×N) determined by a number of sensor elements and a number of sampled values is initialized by storing the sampled values, a second, purely real matrix ($T(\tilde{x})$) which exclusively contains real values, which is assignable to measured values and which has double the number of elements, is determined by a similarity transformation of a centrohermitian matrix, formed from the complex measured-value matrix ($\tilde{x}$) and a combination of an M-dimensional antidiagonal permutation matrix ($\Pi_M$), a complex conjugate ($\tilde{x}^*$) of the measured-value matrix and an N-dimensional antidiagonal permutation matrix ($\Pi_M$), via an M-dimensional left $\Pi$-real adjoint matrix ($Q_M^H$) and a 2N-dimensional left $\Pi$-real matrix ($Q_{2N}$) according to the relationship $T(\tilde{x})=Q_M^H Q_{2N}$, a signal subspace estimation for determining a real signal subspace matrix ($E_s$) by processing the second, purely real matrix ($T(\tilde{x})$) whose signal subspace is spanned by the dominant column vectors of a signal subspace matrix ($E_s$), a subgroup formation, carried out separately for each evaluation dimension, of the centrosymmetric sensor group into two subgroups, shifted relative to one another, is carried out and in each case two selection matrices ($K_1$, $K_2$) are established for each evaluation dimension in accordance with configuration of the subgroups, a solution, carried out separately for each evaluation dimension, determined by the signal subspace matrix ($E_s$), resulting from the signal subgroup formation and containing the dominant column vectors, and the selection matrices ($K_1$, $K_2$) is carried out so that in each case a solution matrix (Y) according to $K_1 E_s Y \approx K_2 E_s$ is available, an eigenvalue matrix, which is real or complex depending on a dimension of the evaluation method, is determined from the solution matrix (Y) and the signal components are reconstructed by multiplying a pseudo inverse of an estimated system matrix, containing the phase factors of the determined eigenvalues, by the complex measured-value matrix.

19. The receiver device as claimed in claim 16, wherein the sensor group is one-dimensional and consists of M elements, and the receiver device is only one direction-evaluation dimension.

20. The receiver device as claimed in claim 18, wherein, using the signal-processing means, a reliability estimate of reconstruction of the signal components is provided by a test of determined eigenvalues.

21. The method as claimed in claim 16, wherein the sensor group is two-dimensional and consists of M elements, and wherein direction evaluation takes place in two dimensions.

22. The receiver device as claimed in claim 21, wherein the sensor group, which is two-dimensional, extensive, centrosymmetric and invariant in two directions, consists of M elements and the receiver device has evaluation dimensions x and y, so that selection matrices ($K_{\mu 1}$, $K_{\mu 2}$, $K_{\nu 1}$, $K_{\nu 2}$) are determined in accordance with the two dimensions of the sensor group, a system of equations determined by the signal subspace matrix ($E_s$), which is produced from a signal subgroup formation and contains the dominant signal vectors, and the selection matrices ($K_1$, $K_2$) is solved for the dimensions x and y according to the relationships $K_{\mu,\nu 1} E_s Y_{\mu,\nu} \approx K_{\mu,\nu 2} E_s$, so that in each case a solution matrix (Y) according to $K_1 E_s Y \approx K_2 E_s$ is implemented and solution matrices ($Y_\mu$, $Y_\nu$) are available, eigenvalues of the solution matrices ($Y_\mu$, $Y_\nu$) are paired via complex determination of a complex eigenvalue matrix ($\Omega$) according to the relationship $Y_\mu + JY_\nu = T\Omega T^{-1}$, and incidence directions, represented by azimuth ($\theta_k$) and elevation angle ($\phi_k$) are determined by the relationships $\omega_{\mu k} = \tan(\mu_k/2)$, $= \tan(\nu_k/2)$; $u_k = \cos\phi_k \sin\theta_k$, $v_k = \sin\phi_k \sin\theta_k$ and $\mu_k = 2\Pi/\lambda \cdot \Delta_x u_k$, $v_k = 2\Pi/\lambda \cdot \Delta_y v_k$.

23. The receiver device as claimed in claim 16, wherein the signal-processing means are configured such that the measured values are spatially smoothed before incidence directions are determined.

24. The receiver device as claimed in claim 16, wherein the sensors are antennas for transmitting and receiving radio-frequency electro-magnetic signals, and the receiver device is part of a base station of a mobile radio network of a wireless communication network.

* * * * *